(12) United States Patent
Hellmann

(10) Patent No.: US 9,806,383 B2
(45) Date of Patent: Oct. 31, 2017

(54) ELECTRIC ENERGY STORAGE DEVICE AND METHOD FOR OPERATING AN ELECTRIC ENERGY STORAGE DEVICE

(71) Applicant: Robert Bosch GmbH, Stuttgart (DE)

(72) Inventor: Manfred Hellmann, Hardthof (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 15/039,490

(22) PCT Filed: Oct. 27, 2014

(86) PCT No.: PCT/EP2014/072944
§ 371 (c)(1),
(2) Date: May 26, 2016

(87) PCT Pub. No.: WO2015/078641
PCT Pub. Date: Jun. 4, 2015

(65) Prior Publication Data
US 2016/0380312 A1    Dec. 29, 2016

(30) Foreign Application Priority Data

Nov. 29, 2013    (DE) .................. 10 2013 224 509

(51) Int. Cl.
*H02P 1/00* (2006.01)
*H01M 10/42* (2006.01)
(Continued)

(52) U.S. Cl.
CPC ......... *H01M 10/425* (2013.01); *H01M 10/44* (2013.01); *H01M 10/441* (2013.01);
(Continued)

(58) Field of Classification Search
CPC ............ H01M 10/443; H01M 10/482; H01M 2010/4271; B60L 11/1851
See application file for complete search history.

(56) References Cited

U.S. PATENT DOCUMENTS

2003/0071523 A1    4/2003  Silverman
2005/0077878 A1    4/2005  Carrier et al.
(Continued)

FOREIGN PATENT DOCUMENTS

DE    102009038663    7/2011
DE    102010027861    10/2011

OTHER PUBLICATIONS

International Search Report for Application No. PCT/EP2014/072944 dated Dec. 22, 2014 (English Translation, 3 pages).

*Primary Examiner* — Karen Masih
(74) *Attorney, Agent, or Firm* — Michael Best & Friedrich LLP

(57) ABSTRACT

The invention relates to an energy storage device and a method for operating an energy storage device comprising a plurality of energy storage modules. In order to adjust the output voltage to the energy storage device, one or more energy storage modules is/are connected in series. According to the invention, the series-connected energy storage modules are selected in accordance with the state of charge and at least one other operating parameter in order to be able to use the individual energy storage modules in a particularly efficient manner.

10 Claims, 4 Drawing Sheets

(51) Int. Cl.
  *H02J 7/00*  (2006.01)
  *H01M 10/44*  (2006.01)
  *H01M 10/48*  (2006.01)
  *H02P 27/04*  (2016.01)

(52) U.S. Cl.
  CPC ....... *H01M 10/443* (2013.01); *H01M 10/482* (2013.01); *H02J 7/007* (2013.01); *H02J 7/0013* (2013.01); *H02J 7/0021* (2013.01); *H02J 7/0026* (2013.01); *H02J 7/0063* (2013.01); *H02P 27/04* (2013.01); *B60L 2230/12* (2013.01); *H01M 2010/4271* (2013.01); *H01M 2220/20* (2013.01)

(56) References Cited

U.S. PATENT DOCUMENTS

| | | | |
|---|---|---|---|
| 2011/0080133 A1* | 4/2011 | Tamburrino | B60L 11/1851 320/101 |
| 2012/0306275 A1 | 12/2012 | Christensen et al. | |
| 2013/0200693 A1 | 8/2013 | Butzmann et al. | |
| 2013/0302657 A1 | 11/2013 | Itakura | |

* cited by examiner

ELECTRIC ENERGY STORAGE DEVICE AND METHOD FOR OPERATING AN ELECTRIC ENERGY STORAGE DEVICE

BACKGROUND OF THE INVENTION

The present invention relates an energy storage device and a method for operating an electric energy storage device.

Electric energy stores are used for the operation of electrical systems, such as, for example, in hybrid or electric vehicles. In addition, electric energy stores are also used in different stationary systems, for example to ensure an uninterrupted current supply in the event of a breakdown or an interruption of an energy supply network. In this regard, batteries which are subdivided into individual modules are particularly known as energy stores. These single modules can be individually selected. In this way, a series connection of selected modules of the battery can be facilitated, wherein the battery terminal voltage can be adjusted by the number of the selected and serially connected modules. Such systems are, for example, known from the German patent application DE 10 2010 027 861 A1. In accordance with a battery voltage to be provided, only a portion of the modules present in the battery is generally required for the application. The remaining modules are then deactivated.

The sum of the voltages of the active, serially connected modules therefore delivers the total battery voltage. A charging or, respectively, discharging current of the battery thus flows only through the active modules.

Because the modules of the battery are stressed to varying degrees and are discharged or, respectively, charged during such an operation using a selective and changing configuration of individual modules within the battery, the individual characteristics, such as state of charge or ageing, of the individual battery modules vary.

There is therefore a need for an energy storage device and a method for operating an energy storage device using an efficient selection of individual energy modules. There is furthermore a need to select the individual energy storage modules in such a way that said individual storage modules can be used as efficiently as possible during the entire service life thereof.

SUMMARY OF THE INVENTION

To this end, the present invention, according to a first aspect thereof, relates to an electric energy storage device for providing a predetermined output voltage, said electric energy storage device comprising a plurality of energy storage modules and a control device, which is designed to ascertain a state of charge and at least one further operating parameter for each of the plurality of energy storage modules, to calculate a number of required energy storage modules in accordance with the predetermined output voltage, to select the calculated number of required energy storage modules from the plurality of energy storage modules using the ascertained state of charge and the at least one further operating parameter and to connect the selected energy storage modules in series.

According to a further aspect, the present invention relates to a method for operating an electric energy storage device for generating a predetermined output voltage, comprising the following steps: providing a plurality of energy storage modules; ascertaining a state of charge for each of the plurality of energy storage modules; ascertaining at least one further operating parameter for each of the plurality of energy storage modules; calculating a number of required energy storage modules in accordance with the predetermined output voltage; selecting energy storage modules from the plurality of energy storage modules using the calculated number of required energy storage modules, the ascertained state of charge and the at least one further operating parameter that was ascertained; and connecting the selected energy storage modules in series.

It is a concept of the present invention to not select the individual energy storage modules of an energy storage device, such as, for example, a battery, in an arbitrary manner or only using the current state of charge but rather to take into account further operating parameters of the individual energy storage modules in addition to the ascertained state of charge when selecting the required number of energy storage modules for providing a desired output voltage. As a result of this selection of the energy storage modules on the basis of the state of charge and further operating parameters, it can be ensured that precisely those energy storage modules are selected which still have a sufficient state of charge in order to provide the required amount of energy, wherein the selection of the individual energy storage modules can also be additionally optimized with respect to the expected service life of the individual energy storage modules. In so doing, an optimized selection of the individual energy storage modules is facilitated.

By means of this optimized selection of the individual energy storage modules, it is possible to carry out the selection of the energy storage modules such that the individual energy storage modules can be operated in a particularly protective manner, and the service life of the individual energy storage modules can therefore be increased.

By means of the inventive selection of the individual energy storage modules, a selection can, furthermore, be facilitated which ensures an optimized operation over the entire service life of the individual energy storage modules.

In one embodiment of the invention, the control device of the energy storage device furthermore comprises a maintenance prognosis device which is designed to provide a prognosis with regard to a remaining service life of each of the plurality of energy storage modules, and wherein the control device preferentially selects energy storage modules having a lower remaining service life. The individual energy storage modules of an energy storage device are preferably replaced within predetermined maintenance intervals as soon as a predetermined point in time is reached. In order to increase the operating reliability, the relevant energy storage modules are also then replaced even if the respective energy storage modules are still properly functioning at the predefined replacement point in time. By preferentially selecting energy storage modules having a projected lower remaining service life, said energy storage modules, which are to be replaced very soon anyway, are thus more greatly stressed shortly prior to this replacement point in time. As a result, the remaining energy storage modules can be protected.

In a further embodiment of the invention, the control device comprises a prioritizing device, which is designed to prioritize a plurality of energy storage modules by using the ascertained state of charge and the at least one further operating parameter, said control device selecting the required energy storage modules on the basis of the prioritization of the prioritizing device. By means of such a prioritization of the individual energy storage modules, a particularly efficient option for selecting a required number of energy storage modules is made possible.

In one embodiment of the invention, the energy storage device further comprises a voltage detector, which is designed to detect an overvoltage or an undervoltage in one of the energy storage modules. By means of such a detection of an overvoltage or undervoltage particularly heavily charged or particularly heavily discharged energy storage modules are identified. Hence, particularly heavily charged energy storage modules can, for example, be preferentially discharged; or particularly heavily discharged energy storage modules can be preferentially charged.

In one embodiment of the invention, the at least one further operating parameter comprises a temperature, a specification regarding a state of ageing and a time span since the last activation and/or power loss of an energy supply module. These operating parameters are particularly well suited to evaluating the current state of the individual energy storage modules and thus to being the basis for the selection of the respective energy storage modules.

In one embodiment of the invention, the at least one further operating parameter further comprises a specification regarding an overvoltage or an undervoltage of an energy storage module.

In a further embodiment of the method according to the invention, the at least one further operating parameter additionally comprises a prognosis regarding a remaining service life of an energy storage module, wherein the step for selecting energy storage modules preferentially selects energy storage modules having a lower remaining service life.

In a further embodiment of the invention, the energy storage device is operated in a charging mode or in a discharging mode.

The present invention further comprises an electric drive system including an energy storage device according to the invention, an electric motor and an inverter, which is designed to convert the output voltage provided by the energy storage device into an AC voltage and provide the same to the electric motor.

BRIEF DESCRIPTION OF THE DRAWINGS

Further embodiments and advantages of the present invention ensue from the following description with reference to the accompanying drawings. In the drawings.

DETAILED DESCRIPTION

Figure 1:
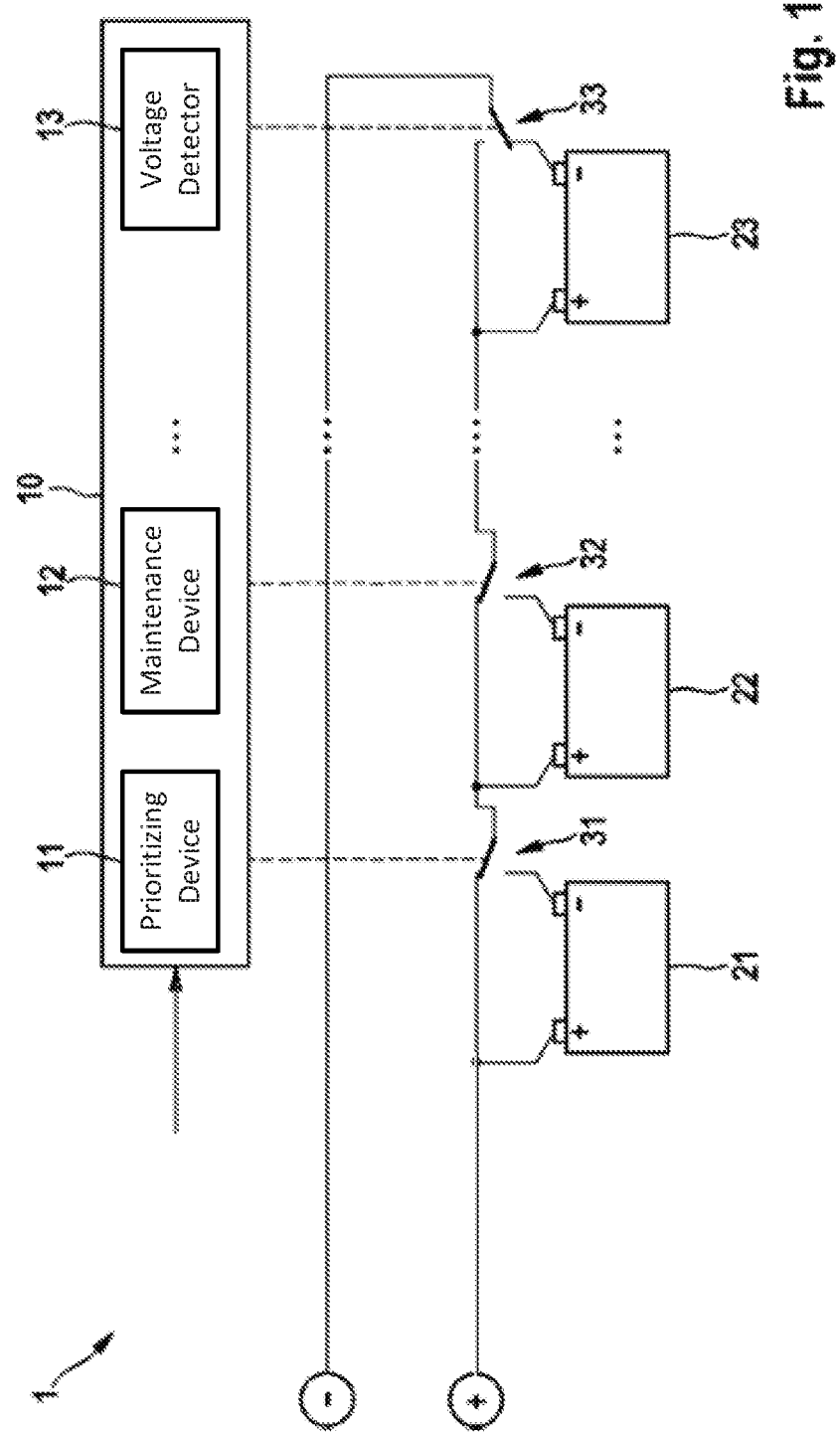
FIG. 1: shows a schematic depiction of an electric energy storage device according to a first exemplary embodiment.

FIG. 1 shows a schematic depiction of a circuit diagram of an electric energy storage device 1 for providing a predetermined output voltage. The electric energy storage device 1 comprises a plurality of energy storage modules 21, 22, 23. According to the switch position of the switching elements 31, 32, 33, the individual energy storage modules 21, 22, 23 can in each case be selected or deselected. In the exemplary embodiment depicted, only the energy storage module 23 is selected. The further energy storage modules 21 and 22 are not selected. In the process, the switching elements 31, 32, 33 are actuated by the control device 20.

The control device 10 evaluates the state of charge of the individual energy storage modules 21, 22, 23 as well as at least one further operating parameter. On the basis of this evaluation, the control device 20 determines the orders of the energy storage modules 21, 22, 23 in which the individual energy storage modules 21, 22, 23 are to be selected. By means of the prioritizing device, the control device 10 furthermore determines, in accordance with a predetermined output voltage $U_{soll}$ that is to be provided by the energy storage device 1, a number n of required energy storage modules 21, 22, 23, which are required in order to achieve the predetermined output voltage. Using a module voltage $U_{mod}$, which can be provided at the energy storage modules 21, 22, 23, the following equation results as a request for the number of required energy storage modules 21, 22, 23:

$$n \geq U_{soll}/U_{mod}$$

The control device 10 subsequently selects the thusly determined number n of energy storage modules 21, 22, 23, wherein the energy storage modules 21, 22, 23 are selected in accordance with the ascertained order, as said order was described above.

The control device 10 furthermore comprises a maintenance device 12 and a voltage detector 13 which are described in greater detail below.

Figure 2:
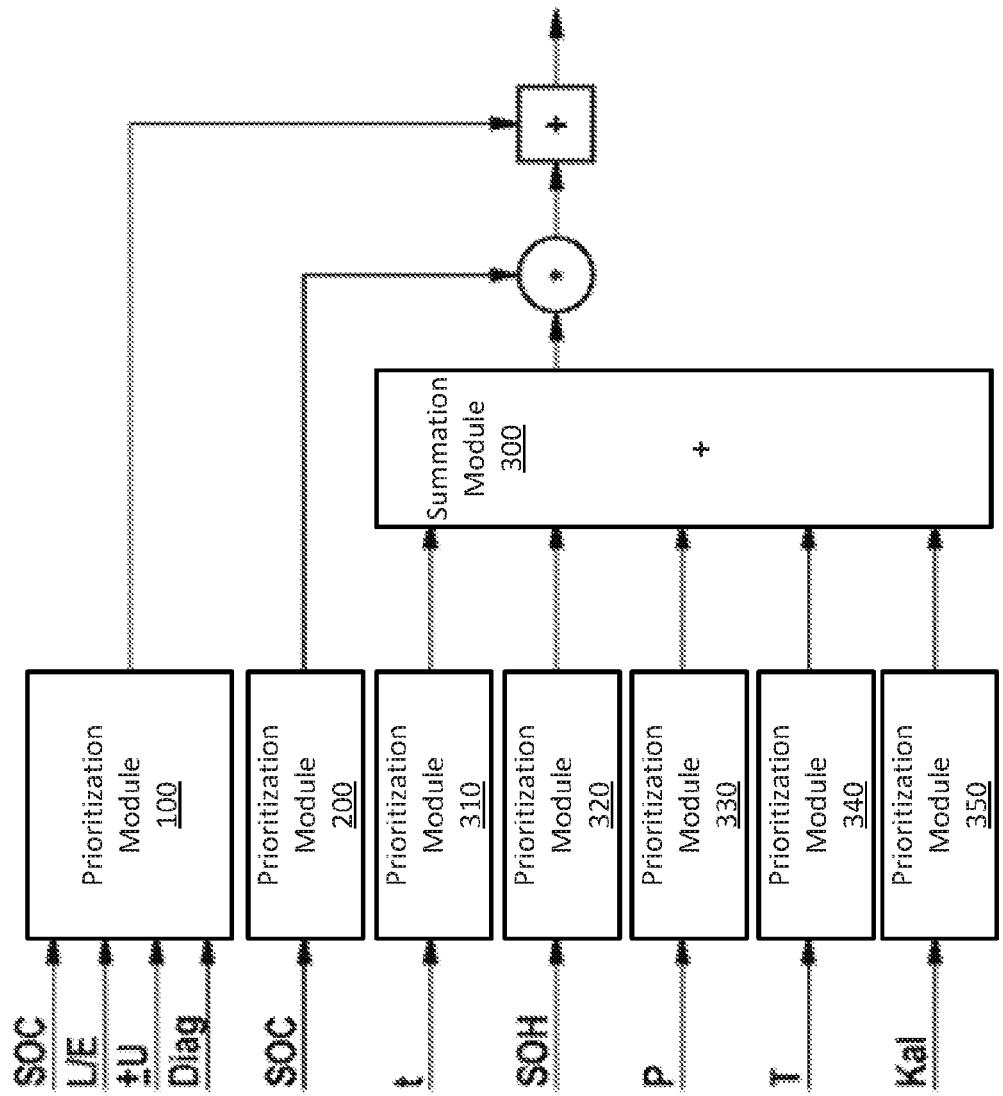
FIG. 2: shows a schematic depiction of a block wiring diagram for a prioritization of energy storage modules, as said diagram underlies a further exemplary embodiment.

FIG. 2 shows a schematic depiction of a block wiring diagram for prioritizing the energy storage modules 21, 22, 23, as said modules underlie the control device 20 in one embodiment. The following parameters can, for example, thereby be used as factors which influence the efficiency or the service life of an energy storage module 21, 22, 23:

t: the time since the last activation of an energy storage module 21, 22, 23. By enlarging the temporal distances between two consecutive activations of an energy storage module 21, 22, 23, the service life of an energy storage module can be increased. Accordingly, a renewed selection can be impeded by means of a lower prioritization of an energy supply module 21, 22, 23 that was just recently activated.

SOH (State of Health): the ageing state of an energy storage module 21, 22, 23. By taking into account this ageing state, the modules can correspondingly be prioritized as higher or lower. An ageing of all of the energy modules which is as uniform as possible can, for example, be achieved by means of an appropriate prioritization. Energy storage modules 21, 22, 23 having a relatively short remaining service life can alternatively also be prioritized higher in order to utilize said modules as efficiently as possible prior to a routine replacement during a maintenance inspection and thereby protect the remaining energy storage modules 21, 22, 23.

P: the power loss which can occur in a module during a current flow to be expected. By taking into account the internal resistance which rises during the course of the service life of a module and the power loss associated therewith, modules having an increased power loss can be prioritized lower and thus be used less frequently. In this way, the total efficiency of the energy storage device 1 is increased.

T: operating temperature of the battery. A raised operating temperature of an energy storage cell 21, 22, 23 leads to an increase in the ageing thereof. A warming of individual energy storage cells 21, 22, 23 that is above average can be countered by a lower prioritization of energy storage modules 21, 22, 23 having a high operating temperature. In so doing, the service life of the energy storage modules 21, 22, 23 can be increased.

Cal: In order to ascertain characteristic values of an energy storage cell 21, 22, 23, such as, for example, state of charge, internal resistance, state of ageing, it may be necessary to connect the corresponding energy storage modules 21, 22, 23 into a bypass in order to interrupt the current flowing through said energy storage modules because a measurement would otherwise be impaired. A request for a calibration (Cal) can therefore correspondingly reduce priority in order to prevent the use of a module; thus enabling sufficient time to be available for a calibration.

Further operating parameters, by means of which the respective energy storage modules 21, 22, 23 can be characterized, are furthermore possible.

The input parameters, such as, for example, t, SOH, P, T, Cal are provided to the corresponding prioritization modules 310, 320, 330, 340 and 350. In so doing, a corresponding prioritization can be calculated in the respective prioritization modules 310-350. Depending on the application, the individual operating parameters can be weighted to varying degrees. The calculated prioritization values are subsequently added up in the summation module 300 and thus a prioritization value is calculated for each energy storage module 21, 22, 23.

In order to avoid an excessive discharge, the energy storage modules 21, 22, 23 having a low state of charge should be stressed as little as possible when being discharged. It is also appropriate that no energy storage modules 21, 22, 23 having a high state of charge are selected during a charging process. In order to prevent the sum of the priority factors for the energy storage modules having a very low state of charge during a discharging process or a very high state of charge during a charging process from becoming too high, this sum can correspondingly be adapted, in particular reduced, to the priority factors in the case of a very low or, respectively, very high state of charge. In this way, the prioritization of the energy storage modules 21, 22, 23 is entirely or at least to a large degree only determined by the state of charge in the case of very low or a very high state of charge. To this end, the state of charge of the corresponding energy storage modules 21, 22, 23 is provided to the corresponding prioritization module 200 for the state of charge SOC.

The voltage detector 13 monitors the voltages of the individual energy storage modules 21, 22, 23 and signals an overvoltage (+U) when a predetermined voltage threshold is exceeded. In addition, an undervoltage (−U) in one of the energy storage modules can be detected when a further voltage threshold is undershot. If an overvoltage has been detected in an energy storage module 21, 22, 23, a further charging of this energy module 21, 22, 23 should be avoided. Such an energy module 21, 22, 23 therefore receives a particularly low priority during the charging process.

During the discharging process, an energy storage module 21, 22, 23 having an overvoltage receives a high priority. In the same way, the discharging process is given a particularly low priority when an undervoltage of an energy storage module 21, 22, 23 is detected, whereas the charging process is given a very high priority.

Furthermore, an item of information regarding the state of charge SOC, an item of information regarding the operating mode, such as charging or discharging, C/D, an item of information regarding overvoltages and/or undervoltages of each energy storage module 21, 22, 23 as well as, if applicable, a diagnostic request (Diag) to the prioritization module 100 are provided for each energy storage module 21, 22, 23. If the energy storage device 1 is, for example, in the discharging mode, an energy storage module 21, 22, 23 having a high state of charge receives a high priority value, whereas, when charging the electrical energy storage device 1, an energy storage module 21, 22, 23 have a low state of charge preferably receives a high priority value. Such an association can, for example, be carried out by means of predetermined characteristic curves. As an alternative to the parameter state of charge (SOH) a module voltage of the individual energy storage modules 21, 22, 23 can, if need be, be used for the prioritization. This is possible because there is a distinct correlation between module voltage and state of charge.

For the purpose of a diagnosis (Diag), a relevant energy storage module 21, 22, 23 can likewise be provided with a very high or very low prioritization in order to carry out the corresponding module tests.

After a corresponding priority value has been determined for all of the energy storage modules 21, 22, 23, a table is calculated comprising an order of all of the energy storage modules 21, 22, 23 which is sorted according to priority. In addition, a number of required energy storage modules 21, 22, 23 is calculated in accordance with the requested target voltage at the output terminals of the energy storage device 1, said number enabling the production of the requested output voltage in a series circuit. If need be, a temporal profile of the required output voltage can also be taken into account in the process. If it, for example, is too be expected that the requested output voltage will further increase within a predetermined period of time, a correspondingly larger number of energy storage modules 21, 22, 23 can be determined already when determining the required number of energy storage modules 21, 22, 23. Hence, a required number of switching processes within the energy storage device 1 can be reduced, which has a positive effect on the amount of stress placed on the energy storage modules 21, 22, 23 and the corresponding switching elements 31, 32, 33.

After the prioritization of the energy storage modules 21, 22, 23 as well as the determination of the required number of energy storage modules 21, 22, 23 is completed, the required number of energy storage modules 21, 22, 23 is selected, for example, in accordance with the prioritization deposited in the table.

In the case of energy storage devices 1 comprising a plurality of energy storage modules 21, 22, 23, individual energy storage modules 21, 22, 23 which only have a short remaining life expectancy are replaced at predetermined points in time. As a rule, these points in time, at which such a replacement is carried out, are specified according to the calendar or by means of an operating hours counter. The energy storage modules to be replaced have for the most part not yet reached the absolute end of the service life thereof at the point in time of the replacement. During the previously described prioritization, a prognosis regarding the remaining service life can be included in the prioritization process in order to use the individual energy storage modules as efficiently as possible prior to the replacement thereof. If a replacement of an energy storage module 21, 22, 23 lies ahead, such energy storage modules 21, 22, 23 can thus receive a higher priority and therefore be preferentially selected. Energy storage modules 21, 22, 23, the replacement of which is intended within a predetermined period of time, can, for example, be provided with a higher priority. In this way, such energy storage modules 21, 22, 23 are preferentially selected. At the point in time of the replacement of the energy storage modules 21, 22, 23, the predicted maximum service life of an energy storage module 21, 22, 23 can thereby be utilized as completely as possible. Energy storage modules 21, 22, 23 having a longer predicted remaining service life, which have first to be replaced at a later point in time, are thus less frequently selected. This leads in total to an efficient usage of the energy storage modules 21, 22, 23 used.

Figure 3:
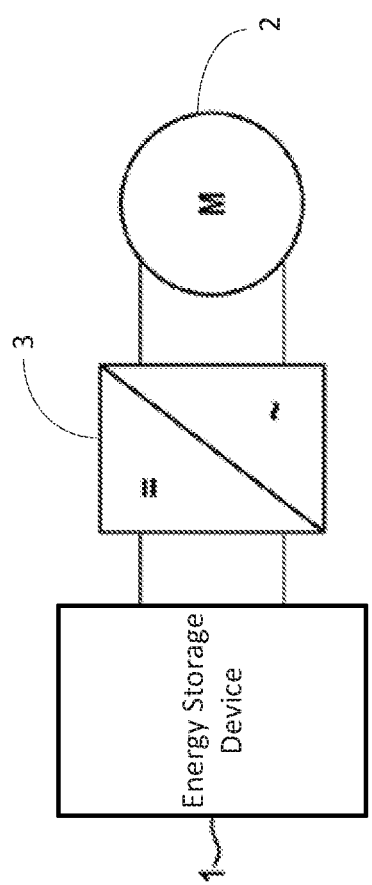
FIG. 3: shows a schematic depiction of a drive system according to one exemplary embodiment.

FIG. 3 shows a schematic depiction of an electric drive system comprising an energy storage device 1 according to one exemplary embodiment. The drive system comprises an electric motor 2 which is fed by an inverter 3. In the process, the inverter 3 converts the output voltage provided by the energy storage device 1 into an AC voltage and provides this AC voltage to the electric motor 2.

Figure 4:
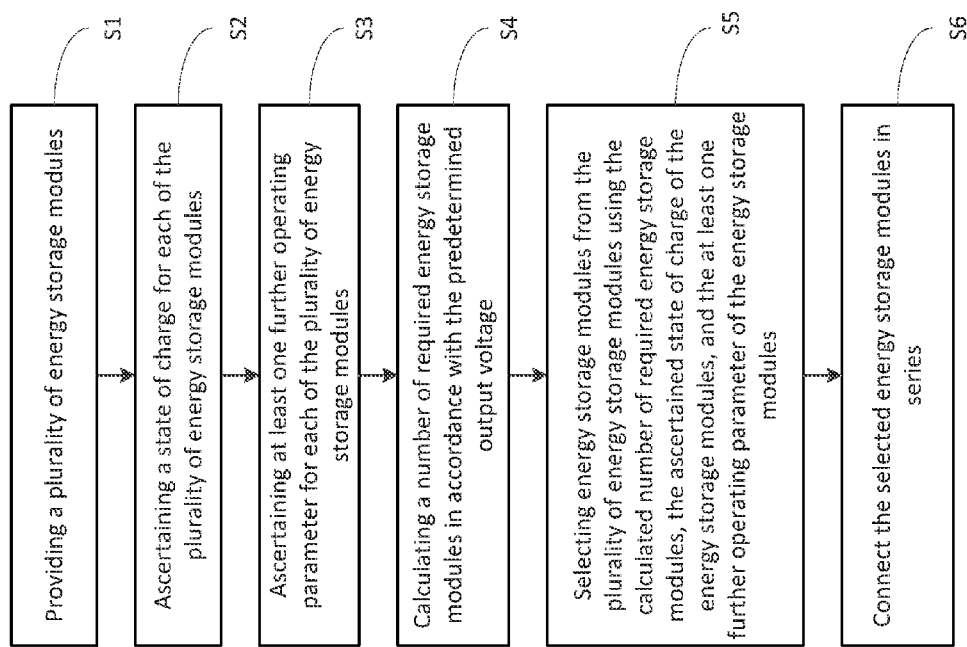
FIG. 4: shows a schematic depiction of a flow diagram, as said diagram underlies a further exemplary embodiment.

FIG. 4 shows a schematic depiction of a flow diagram, as said diagram underlies an exemplary embodiment for a method for operating an electric energy storage device 1 for generating a predetermined output voltage. In step S1, a plurality of energy storage modules 21, 22, 23 is provided. In step S2, a state of charge SOC is ascertained for each of the plurality of energy storage modules 21, 22, 23. In step S3, at least one further operating parameter is ascertained for each of the plurality of energy storage modules 21, 22, 23. These further operating parameters can, for example, comprise a temperature of an energy storage module 21, 22, 23, a specification regarding a state of charging of an energy storage module 21, 22, 23, a time span since the last activation of an energy storage module 21, 22, 23 and/or a power loss of an energy storage module 21, 22, 23. In addition, the operating parameters can comprise a specification regarding an overvoltage and/or an undervoltage of an energy storage module 21, 22, 23. Furthermore, the operating parameters can comprise a prognosis regarding a remaining service life of an energy storage module 21, 22, 23.

In step S4, a number of required energy storage modules is calculated, which is required to provide the predetermined output voltage at the energy storage device 1. In step S5, one or a plurality of energy storage modules 21, 22, 23 is subsequently selected from the plurality of energy storage modules 21, 22, 23 while using the calculated number of required energy supply modules 21, 22, 23, the ascertained state of charge and the at least one further operating parameter. In step S5, the selected energy supply modules 21, 22, 23 are subsequently connected in series. If the operating parameter comprises a prognosis regarding a remaining service life of an energy storage module 21, 22, 23, energy storage modules 21, 22, 23 are then preferentially selected which have a short remaining service life in the step for selecting energy storage modules 21, 22, 23.

The method for operating an energy storage device can be used for a charging operation as well as for a discharging operation.

In summary, the present invention relates to an energy storage device and a method for operating an energy storage device comprising a plurality of energy storage modules. In order to adapt the output voltage to the energy storage device, one or a plurality of energy storage modules is connected in series. The energy modules connected in series are selected for a particularly efficient usage of the individual energy storage modules in accordance with the state of charge and at least one further operating parameter.

The invention claimed is:

1. An electric energy storage device for providing a predetermined output voltage, comprising:
a plurality of energy storage modules; and
a control device configured to
ascertain a state of charge and at least one further operating parameter for each of the plurality of energy storage modules via at least one selected from a group consisting of a voltage detector and a maintenance prognosis device,
calculate a number of required energy storage modules in accordance with the predetermined output voltage,
select the calculated number of required energy storage modules from the plurality of energy storage modules using the ascertained state of charge and the at least one further operating parameter, and
connect the selected energy storage modules in series.

2. An energy storage device according to claim 1, wherein the control device comprises a prioritizing device, which is designed to prioritize the plurality of energy storage modules using the ascertained state of charge and the at least one further operating parameter and wherein the control device selects the required energy storage modules on the basis of the prioritization of the prioritizing device.

3. The energy storage device according to claim 1, wherein the maintenance prognosis device is designed to provide a prognosis regarding the remaining service life of the energy storage modules, and wherein the control device preferentially selects energy storage modules having a low remaining service life.

4. The energy storage device according to claim 1, wherein the control device includes the voltage detector, which is designed to detect an overvoltage, an undervoltage, or both in one of the energy storage modules.

5. An electric drive system, comprising:
an energy storage device according to claim 1;
an electric motor; and
an inverter which is designed to convert the output voltage provided by the energy storage device into an AC voltage and supply said AC voltage to the electric motor.

6. A method for operating an electric energy storage device for generating a predetermined output voltage, comprising the following steps:
providing a plurality of energy storage modules;
ascertaining a state of charge for each of the plurality of energy storage modules;
ascertaining at least one further operating parameter for each of the plurality of energy storage modules;
calculating a number of required energy storage modules in accordance with the predetermined output voltage;
selecting energy supply modules from the plurality of energy supply modules using the calculated number of required energy storage modules, the ascertained state of charge of the energy storage modules, and the at least one further operating parameter of the energy storage modules; and
connecting the selected energy storage modules in series.

7. The method according to claim 6, wherein the at least one further operating parameter includes at least one selected from a group consisting of a temperature, a specification regarding a state of ageing, a time span since the last activation, and a power loss of an energy storage module.

8. The method according to claim 6, wherein the at least one further operating parameter includes at least one specification regarding an overvoltage or an undervoltage of an energy storage module.

9. The method according to claim 6, wherein the at least one further operating parameter includes a prognosis regarding a remaining service life of an energy storage module, and wherein selecting the energy storage modules from the plurality of energy storage modules includes preferentially selecting energy storage modules having a short remaining service life.

10. The method according to claim 6, wherein the energy storage device operates in a charging mode or in a discharging mode.

\* \* \* \* \*